J. R. FLANNERY, E. I. DODDS AND C. HYLAND.
STAYBOLT FOR BOILERS.
APPLICATION FILED MAR. 7, 1917.
1,364,096.
Patented Jan. 4, 1921.
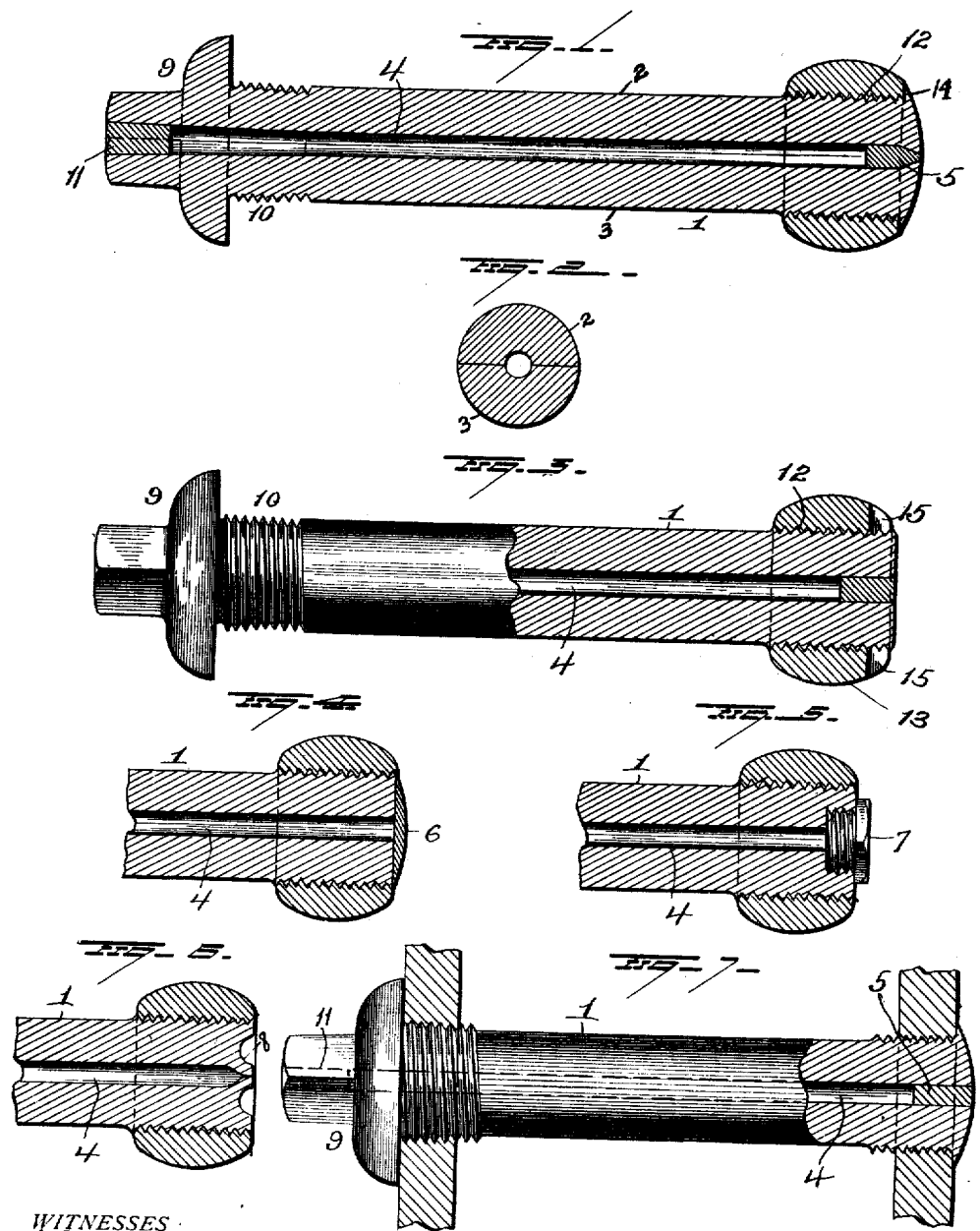

UNITED STATES PATENT OFFICE.

JOHN ROGERS FLANNERY, ETHAN I. DODDS, AND CHARLES HYLAND, OF PITTSBURGH, PENNSYLVANIA, ASSIGNORS TO FLANNERY BOLT COMPANY, OF PITTSBURGH, PENNSYLVANIA.

STAYBOLT FOR BOILERS.

1,364,096.   Specification of Letters Patent.   Patented Jan. 4, 1921.

Application filed March 7, 1917. Serial No. 153,123.

*To all whom it may concern:*

Be it known that we, JOHN R. FLANNERY, ETHAN I. DODDS, and CHARLES HYLAND, citizens of the United States, and residents of Pittsburgh, in the county of Allegheny and State of Pennsylvania, have invented certain new and useful Improvements in Staybolts for Boilers; and we do hereby declare the following to be a full, clear, and exact description of the invention, such as will enable others skilled in the art to which it appertains to make and use the same.

This invention relates to improvements in staybolts for boilers and more particularly to such as are made with tell-tale holes, one object of the invention being to so construct a staybolt of tubular iron with a continuous bore extending from end to end thereof, that the head shall be applied thereto in such manner that no portion of said bore will be closed or contracted during the operation of applying the head, and so that the end of the bore may be closed by a separate member at the outer headed end of the bolt and be continuous from said separate closing member to the inner end of the bolt.

With this and other objects in view, the invention consists in certain novel features of construction and combinations of parts as hereinafter set forth and pointed out in the claims.

In the accompanying drawings; Figure 1 is a longitudinal sectional view of a staybolt embodying our invention; Fig. 2 is a cross section of the same, Figs. 3, 4, 5 and 6 are views showing slight modifications, and Fig. 7 is a view of a modification.

The body 1 of the bolt may comprise two mated members 2—3 welded together and so formed as to provide a continuous longitudinal bore extending through said body from end to end thereof, said bore constituting a tell-tale hole 4 for the bolt which will be continuous through the body of the bolt from one boiler sheet to the other and which is accessible from the inner end of the bolt,— the outer end of said bore at the outer headed end of the bolt being closed. To effect the permanent closing of the bore or tell-tale hole at the outer headed end of the bolt, we may drive a metal plug 5 into the end of the bore as shown in Figs. 1, 3 and 7; or we may seal the end of the bore by applying a welded patch 6 to the end of the bolt body, as shown in Fig. 4; or the end of the bolt body may be made with a threaded socket receiving a threaded plug 7 as shown in Fig. 5; or the metal at the end of the bolt body may be spun in a manner to close the end of the bore, as indicated at 8 in Fig. 6.

With our improvements, the tubular body portion of the bolt is provided with a rounded head in such manner that there will be no danger of closing the bore for a prohibitive distance inwardly beyond the head when the body of the bolt is being provided with the head, and the application of the head is facilitated and its permanent connection insured. We are therefore enabled to avoid the closing of the tell-tale hole for a prohibitive distance from the head as would be liable to occur if a head be forged at the end of the tubular body portion of the bolt.

In the embodiment of our invention shown in Fig. 1, the inner end of the bolt is provided with a head 9 of the "button head" type to bear against the inner boiler sheet and adjacent to said head, the bolt is threaded as at 10 to screw through said inner boiler sheet. The tell-tale hole extends through the "button-head" inner end of the bolt and may be closed by a temporary or removable plug 11.

The outer end portion of the bolt body is threaded, as at 12, to receive the outer head 13. This head is made in the form of an interiorly threaded sleeve and its outer face is convex so that when it is in place on the end of the bolt body, the latter will be provided with a bearing head of partly spherical form and produce a structure of the flexible staybolt type.

After the head shall have been screwed onto the threaded outer end of the bolt, we prefer to weld the threaded connection as indicated by dotted lines in Fig. 1. This may be readily accomplished by electrical welding, viz., by including the head and the bolt body in the circuit of a suitable source of electrical energy.

After the head shall have been screwed onto the bolt body, the outer plugged end of the latter may be upset over the outer end of the head, as indicated at 14, in Fig. 1.

If desired, the upsetting of the end of the bolt body might be omitted, and the annular head may be provided with notches 15 for the reception of a wrench, as indicated in Fig. 3.

With our improvements, the tubular body portion of the bolt may be provided with a rounded head in such manner that there will be no danger of closing a prohibitive portion of the bore when the body of the bolt is being provided with the head, and the application of the head is facilitated and its permanent connection insured.

In the construction shown in Fig. 7, the separate head at the outer end of the bolt is omitted and the removable plug is inserted into the bore at the headed inner end of the bolt.

Having fully described our invention what we claim as new and desire to secure by Letters Patent, is:—

1. A staybolt comprising a body portion having a bore extending from end to end, a separate head encircling the outer end portion of the body of the bolt and secured thereto, and means independent of said head, closing the outer end of said bore.

2. A staybolt for boilers comprising a bar having a bore from end to end, a permanent closure for the outer end of said bore, a temporary closure for the inner end of said bore, and a separate annular head permanently secured to the outer end of the bar, independently of the closure for the bore in said bar.

3. A staybolt having a bore extending through the same from end to end and threaded externally at its outer end, a separate annular internally threaded head having a rounded bearing face, screwed on the threaded outer end portion of the bolt body and permanently welded thereto, and means independently of said head closing the bore at the outer end of said bolt body.

4. A staybolt having a longitudinal bore extending through the same from end to end, a plug permanently closing the outer end of said bore, a separate head secured to the plugged end of the body, and an upset portion on the outer end of said body portion and overlying said separate head and engaging said plug.

5. A staybolt having a longitudinal bore extending through the same from end to end, a "button head" at the inner end of the bolt, a separate bearing head secured on the outer end of said bolt, and means permanently closing the end of the bore at the outer end of the bolt to which the bearing head is secured.

6. A staybolt having a long bore extending through same from end to end, a buttonhead at the one end of the bolt, the bore permanently closed at the outer end of the bolt, and a removable plug being inserted at said headed end of the bolt.

In testimony whereof, we have signed this specification in the presence of two subscribing witnesses.

JOHN ROGERS FLANNERY.
ETHAN I. DODDS.
CHARLES HYLAND.

Witnesses:
EDWIN S. RYCE,
HAROLD SCHUNEMAN.